US011763427B2

(12) United States Patent
Palmaro et al.

(10) Patent No.: US 11,763,427 B2
(45) Date of Patent: Sep. 19, 2023

(54) METHOD AND SYSTEM FOR INTELLIGENT IMPORTING AND TRANSFORMATION OF DIGITAL ASSETS

(71) Applicant: Unity IPR ApS, Copenhagen (DK)

(72) Inventors: Gregory Lionel Xavier Jean Palmaro, San Francisco, CA (US); Charles Janusz Migos, Millbrae, CA (US); Patrick Gustaevel, Montreal (CA); Gerald James William Orban, New Westminster (CA)

(73) Assignee: Unity IPR ApS, Copenhagen (DK)

(*) Notice: Subject to any disclaimer, the term of this patent is extended or adjusted under 35 U.S.C. 154(b) by 0 days.

(21) Appl. No.: 17/219,787

(22) Filed: Mar. 31, 2021

(65) Prior Publication Data

US 2021/0304362 A1 Sep. 30, 2021

Related U.S. Application Data

(60) Provisional application No. 63/003,266, filed on Mar. 31, 2020.

(51) Int. Cl.
*G06N 20/00* (2019.01)
*G06T 3/40* (2006.01)
*G06T 5/00* (2006.01)

(52) U.S. Cl.
CPC ........... *G06T 3/4084* (2013.01); *G06N 20/00* (2019.01); *G06T 5/005* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 8,566,329 | B1* | 10/2013 | Freed | G06F 16/14 |
| | | | | 707/913 |
| 10,970,923 | B1* | 4/2021 | Nussbaum | G06T 17/05 |
| 2003/0212990 | A1* | 11/2003 | Brodkorb | G06F 8/61 |
| | | | | 717/170 |
| 2006/0259386 | A1* | 11/2006 | Knowlton | G06F 8/30 |
| | | | | 707/999.1 |
| 2008/0098042 | A1* | 4/2008 | Tian | H04L 7/0004 |
| 2010/0030552 | A1* | 2/2010 | Chen | G06F 16/367 |
| | | | | 704/9 |
| 2012/0249741 | A1* | 10/2012 | Maciocci | G06T 19/006 |
| | | | | 348/51 |
| 2014/0218397 | A1* | 8/2014 | Rutman | G06T 19/20 |
| | | | | 345/632 |

(Continued)

*Primary Examiner* — Anh-Tuan V Nguyen (74) *Attorney, Agent, or Firm* — Schwegman Lundberg & Woessner, P.A.

(57) ABSTRACT

A method of intelligently transforming a digital asset for a target environment is disclosed. Asset data describing the digital asset is received. The received asset data is analyzed to determine a classification type for the digital asset. A database is communicated with to request additional data associated with the determined classification type. The additional data includes semantic data associated with the classification type. The additional data is compared to the received asset data. The comparing includes determining missing data and conflicting data. The missing data includes data from the additional data which is absent from the asset data. The missing data is added to the asset data.

18 Claims, 6 Drawing Sheets

(56) References Cited

U.S. PATENT DOCUMENTS

| | | | | |
|---|---|---|---|---|
| 2014/0333666 A1* | 11/2014 | Poulos | ............ | G02B 27/017 |
| | | | | 345/633 |
| 2015/0379774 A1* | 12/2015 | Trainor | ............ | H04L 67/561 |
| | | | | 345/633 |
| 2016/0117574 A1* | 4/2016 | Mei | ............ | G06K 9/627 |
| | | | | 382/159 |
| 2016/0142859 A1* | 5/2016 | Molinet | ............ | H04L 67/63 |
| | | | | 709/203 |
| 2016/0379091 A1* | 12/2016 | Lin | ............ | G06K 9/6256 |
| | | | | 382/156 |
| 2017/0054611 A1* | 2/2017 | Tiell | ............ | G06Q 30/0631 |
| 2019/0005043 A1* | 1/2019 | Hemani | ............ | G06F 16/374 |
| 2020/0117388 A1* | 4/2020 | Horns | ............ | G06F 3/0604 |
| 2020/0273090 A1* | 8/2020 | Ayush | ............ | G06T 19/20 |
| 2021/0089335 A1* | 3/2021 | Wang | ............ | G06F 9/5077 |

\* cited by examiner

METHOD AND SYSTEM FOR INTELLIGENT IMPORTING AND TRANSFORMATION OF DIGITAL ASSETS

CROSS-REFERENCE TO RELATED APPLICATIONS

This application claims the benefit of U.S. Provisional Application No. 63/003,266, filed Mar. 31, 2020, entitled "METHOD AND SYSTEM FOR INTELLIGENT IMPORTING AND TRANSFORMATION OF DIGITAL ASSETS," which is incorporated by reference herein in its entirety

TECHNICAL FIELD

The subject matter disclosed herein generally relates to the technical field of computer systems, and in one specific example, to computer systems and methods for using artificial intelligence (AI) for importing and transforming digital assets.

BACKGROUND OF THE INVENTION

In the world of digital content creation (e.g., including video game development, movie production, and the like), there is a great need for the use of digital assets. Digital assets may represent objects (e.g., chairs, guns, buildings, characters, and the like) and effects (e.g., animations, particle physics, lighting effects, and the like) that can be added to and manipulated within the digital content. The digital assets may be created in 3D content creation software and exported (e.g., within data files) to be used at a later time by digital content creation software. During the creation of digital content, the assets may be imported and integrated into a digital environment. However, as happens frequently, assets may not be optimized for the digital environment or may contain errors necessitating much manual work to correct. For example, an asset created for a video game may not have the correct format or scale for a film environment and would require adjustment. Manually adjusting a few assets may be feasible, but manually adjusting a large number of assets required for a large project is not efficient.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'digital content' or 'content' used throughout the description herein should be understood to include all forms of media including images, videos (e.g., movies), audio, video games, text, 3D models (e.g., including textures, materials, meshes, and more), animations, vector graphics, and the like.

The term 'video game' or 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

Throughout the description herein, the term "agent" and "AI agent" should be understood to include entities such as a non-player character (NPC), a robot, and a game world which are controlled by an artificial intelligence system or model.

Throughout the description herein, the term 'mixed reality' (MR) should be understood to include all combined environments in the spectrum between reality and virtual reality (VR) including virtual reality, augmented reality (AR) and augmented virtuality.

A method of intelligently transforming a digital asset for a target environment is disclosed. Asset data describing the digital asset is received. The received asset data is analyzed to determine a classification type for the digital asset. A database is communicated with to request additional data associated with the determined classification type. The additional data includes semantic data associated with the classification type. The additional data is compared to the received asset data. The comparing includes determining missing data and conflicting data. The missing data includes data from the additional data which is absent from the asset data. The missing data is added to the asset data.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits to digital content creators. For example, the systems and methods described herein simplify importing of digital assets into a digital content project by providing guided intelligent adjustment of digital asset properties (e.g., via modification of data and metadata associated with the digital asset) using traits and environmental context, including conformity of scale and size to standards, as well as adding smart contextual surfaces to the digital assets. As another example, the systems and methods described herein (e.g., specifically with respect to FIG. 1A, FIG. 1B, FIG. 2, and FIG. 3) accelerate development of digital content by providing assisted digital content importing or modification, the assistance including modifying data and metadata in order to add semantic data to a digital asset or correct data associated with a digital asset. The assisted digital content importing or modification may be applied automatically in bulk to a plurality of digital assets with little or no human interaction.

Figure 1A:
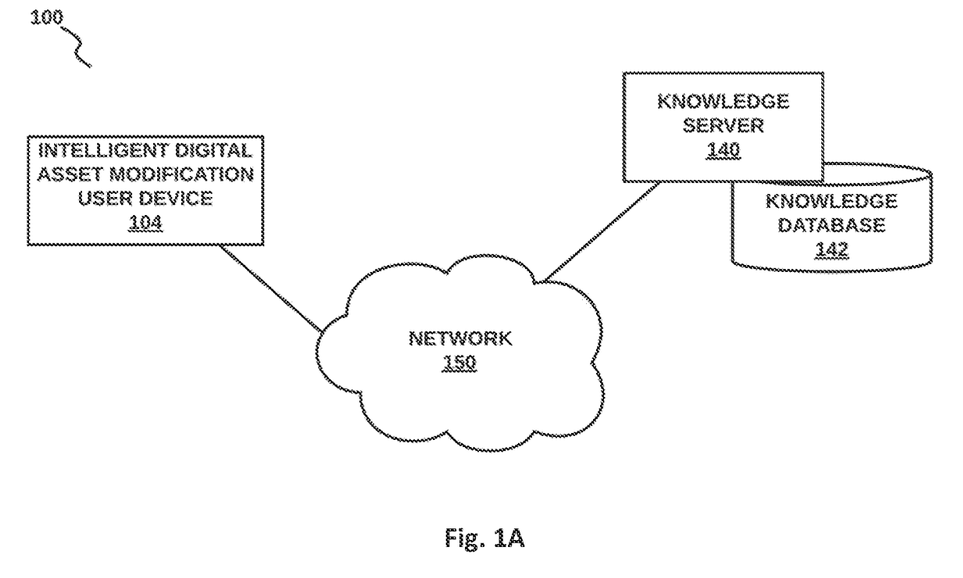
FIG. 1A is a schematic illustrating an intelligent digital asset modification system, in accordance with one embodiment.

Turning now to the drawings, systems and methods, including non-routine or unconventional components or operations, or combinations of such components or operations, for intelligent modifying of data and metadata associated with digital assets in accordance with embodiments of the invention are illustrated. For example, the intelligent modifying of data and metadata associated with a digital asset may be performed as part of importing the digital asset into a 3D content creation application (e.g., within a 3D environment). In accordance with an embodiment, FIG. 1A is a diagram of an example intelligent digital asset modification system 100 and associated devices configured to provide intelligent digital asset modification functionality. In the example embodiment, the intelligent digital asset modification system 100 includes a user device 104 (e.g., which may be operated by a human user (not shown)) and a knowledge server 140 coupled in networked communication with the user device 104 via a network 150 (e.g., a cellular network, a Wi-Fi network, the Internet, and so forth). In some embodiments, the knowledge server 140 may include a knowledge database 142 that may include ontological information. In some embodiments, the user device 104 is a mobile computing device, such as a smartphone, a tablet computer, a laptop computer, a head mounted virtual reality (VR) device or a head mounted augmented reality (AR) device capable of providing a digital environment to a user. In other embodiments, the user device 104 is a computing device such as a desktop computer capable of providing a digital environment to a user.

Figure 1B:
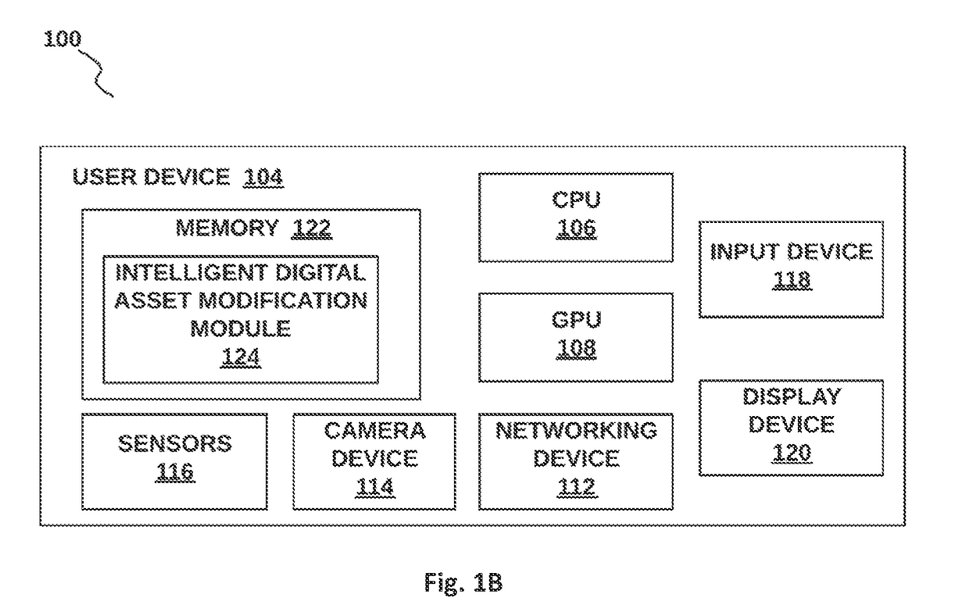
FIG. 1B is a schematic illustrating an intelligent digital asset modification user device within an intelligent digital asset modification system, in accordance with one embodiment.

In the example embodiment and shown in FIG. 1B, the user device 104 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein (e.g., in reference to FIG. 2 and FIG. 3). The user device 104 also includes one or more networking devices 112 (e.g., wired or wireless network adapters) for communicating across the network 150. The user device 104 may further include one or more camera devices 114 which may be configured to capture digital video of the real world near a user (e.g., a user holding the user device 104) during operation. The user device 104 may also include one or more sensors 116, such as a global positioning system (GPS) receiver (e.g., for determining a GPS location of the user device 104), biometric sensors (e.g., for capturing biometric data of a user), motion or position sensors (e.g., for capturing position data of a user or other objects), or an audio microphone (e.g., for capturing sound data). Some sensors 116 may be external to the user device 104, and may be configured to wirelessly communicate with the user device 104 (e.g., such as used in the Microsoft Kinect®, Vive Tracker™, MIT's Lidar sensor, or MIT's wireless emotion detector).

The user device 104 also includes one or more input devices 118. The input device 118 is any type of input unit such as a mouse, a keyboard, a keypad, pointing device, a touchscreen, a microphone, a camera, a hand-held device (e.g., hand motion tracking device) and the like, for inputting information in the form of a data signal readable by the processing device 106. The user device 104 further includes one or more display devices 120, such as a touchscreen of a tablet or smartphone, or lenses or visor of a VR or AR HMD, which may be configured to display digital objects to a user in conjunction with a real world view.

The user device 104 also includes a memory 122 configured to store a client intelligent digital asset modification system module ("client module") 124. The memory 122 can be any type of memory device, such as random access memory, read only or rewritable memory, internal processor caches, and the like. The memory may also store a game engine (not shown) (e.g., executed by the CPU 106 or GPU 108) that communicates with the display device 120 and also with other hardware such as the input/output device(s) 118 to present a 3D game environment (e.g., a video game) or a 3D digital content creation environment to a user. The game engine would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be decoupled, each being performed independently and concurrently, such that the rendering step always uses a recent state of the virtual environment and current settings of the virtual scene to generate a visual representation at an interactive frame rate and, independently thereof, the simulation step updates the state of at least some of the digital objects (e.g., at another rate).

In accordance with an embodiment, the knowledge server 140 includes a memory 132 (not shown in FIG. 1A) storing a server intelligent digital asset modification system module ("server module") 134. During operation, the client intelligent digital asset modification system module 124 and the server intelligent digital asset modification system module 134 perform the various intelligent digital asset modification functionalities described herein (e.g., in reference to FIG. 2 and FIG. 3). More specifically, in some embodiments, some functionality may be implemented within the client module 124 and other functionality may be implemented within the server module 134.

Figure 2:
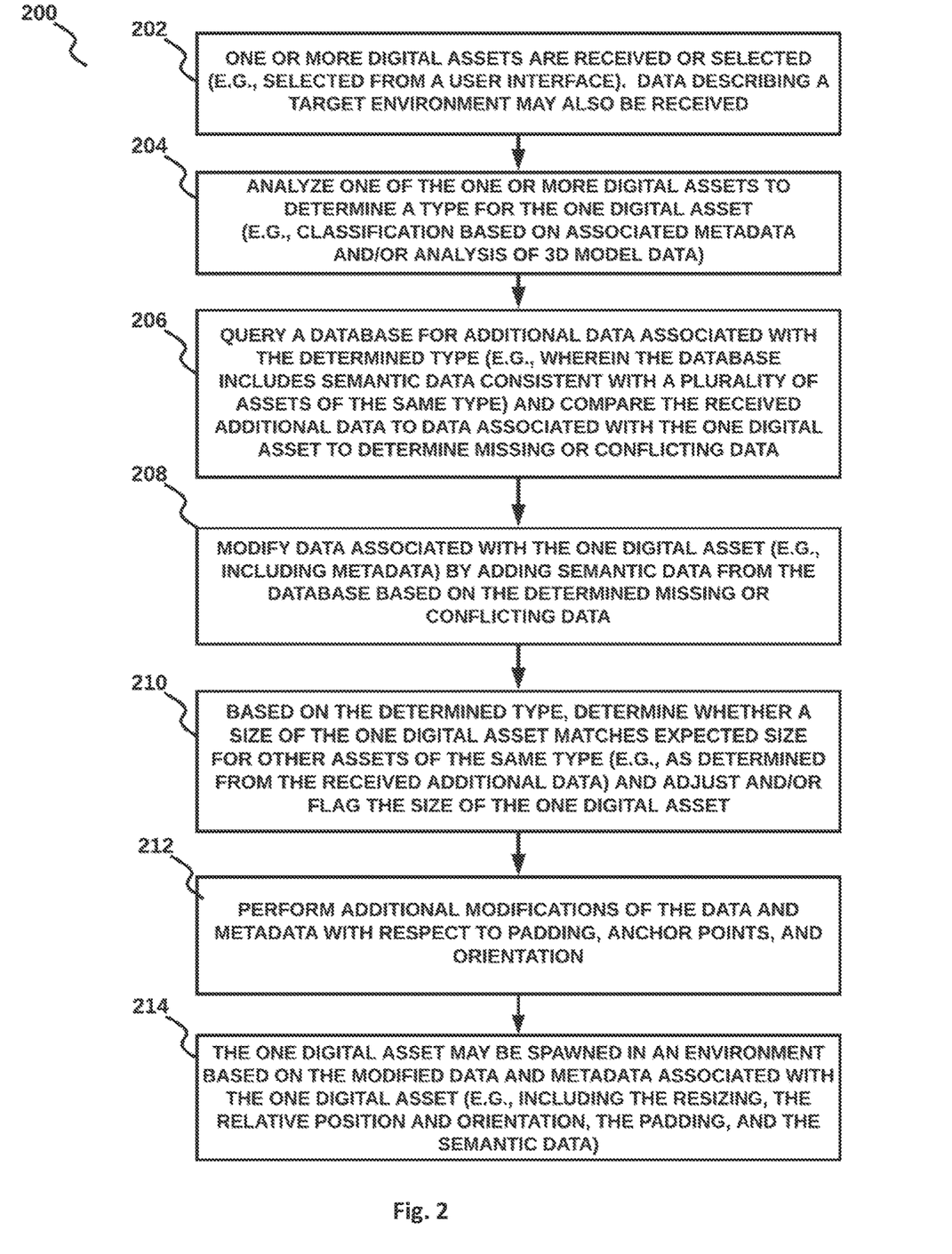
FIG. 2 is a flowchart illustrating a method for intelligent digital asset modification using an intelligent digital asset modification system, in accordance with one embodiment.

In accordance with an embodiment, and shown in FIG. 2, is a flowchart of a method 200 for intelligently modifying (e.g., adding and/or correcting) data and metadata associated with a digital asset. In accordance with an embodiment, the modifying of metadata may include the modifying of semantic data associated with the digital asset (e.g., as described with respect to operation 206 and 208). In accordance with an embodiment, the modifying of data associated with the digital asset may include modification of a size of the digital asset as described in operation 210. In accordance with an embodiment, the modifying of data associated with the digital asset may include modification of data describing an orientation of the digital asset (e.g., around a pivot point) as described in operation 212A. In accordance with an embodiment, the modifying of data associated with the digital asset may include modification of one or more anchor points associated with the digital asset as described in operation 212B. In accordance with an embodiment, the modifying of data associated with the digital asset may include modification of padding associated with the digital asset as described in operation 212C. The method 200 may be used in conjunction with the intelligent digital asset modification system 100 as described with respect to FIG. 1A and FIG. 1B. In various embodiments, some of the method elements shown with respect to the method 200 may be performed concurrently, in a different order than shown, or may be omitted.

In accordance with an embodiment, the modifying of data and metadata associated with a digital asset as described the method 200 may be used (e.g., as part of a pipeline) to reformat a digital asset from a first format optimized for a first use (or environment) to a second format optimized for a second use (or environment). For example, the method 200 may be used to change a format of a digital asset from a first format which is optimized for a video game environment to a second format which is optimized for a digital film environment. This may convert digital assets from a video game into associated digital assets optimized for a digital movie of the video game, and thereby save time by avoiding much manual labor in converting the digital assets.

In accordance with an embodiment, the modifying of data and metadata associated with a digital asset as described in the method 200 may be used (e.g., as part of a pipeline) to add behaviors and intelligence to digital assets via the data and the metadata. A digital asset typically includes data to describe the asset allowing the digital asset to be used in a digital environment (e.g., via a 3D content creation software) and rendered (e.g., by a rendering pipeline) into a display; for example, a digital asset that represents a tree may include 3D model data such as mesh data, polygon data, materials data (color, reflectivity, etc.), size data, orientation data and the like. However, even though digital assets have data which allows them to be placed and rendered within a digital environment, they often have no associated semantic information and are considered dumb, or lacking of intelligence. For example, the digital asset representing a tree may have data describing a 3D digital model of a tree, but it may not contain any semantic information associated with it being a tree.

In accordance with an embodiment, the adding of intelligence may include adding or correcting of spawning criteria data (or 'spawning data') within the metadata of a digital asset, wherein the spawning data provides a description of spawning properties and conditions for the digital asset to spawn in an environment (e.g., via a 3D content creation application). Throughout the description herein, the term 'spawning' should be understood to relate to a creation (e.g., instantiation) and placement of a digital object in an environment based on spawning data within the metadata. For example, the spawning data associated with a digital object may specify where and how the digital object can be spawned (e.g., instantiated or created, and placed) within the environment. In accordance with an embodiment, spawning data for a digital object can include one or more of the following: location criteria (e.g., including location of the digital object with respect to other objects in the environment, elevation of the digital object above another object, and the like), proximity criteria (e.g., including distance criteria between the digital object and one or more additional objects in the environment), orientation criteria (e.g., an angle criteria between the digital object and other objects or surfaces within the environment), and alignment criteria (e.g., including horizontal and vertical alignment of a part of the digital object with one or more objects (or parts of the objects such as surfaces) in the environment).

In accordance with an embodiment, at operation 202 of the method 200, one or more digital assets are received by the intelligent digital asset modification module 124. In accordance with an embodiment, the one or more digital assets may be selected by a user within a user interface using a mouse, a pointing gesture or any other selection method. In accordance with an embodiment, and as part of operation 202, a target environment (e.g., including a semantic description thereof) may be received or selected, wherein the target environment is an environment within which the one or more digital assets may be deployed (e.g., spawned, instantiated, or the like). For example, the environment may be described via descriptive semantic labels such as 'a kitchen', 'a tropical forest', 'a beach at sundown', 'a gym', and the like. The environment may also include a digital 3D model of the environment, and objects therein (e.g., digital objects of trees, bushes, rocks, mountains, and the like). The environment may be selected by the user via the user interface (e.g., similar to the selection of the one or more digital assets). In accordance with an embodiment, the environment may be previously selected and data describing the environment may be received with the received one or more digital assets.

In accordance with an embodiment, at operation 204 of the method 200, the intelligent digital asset modification module 124 analyzes one of the one or more digital assets to determine a type (e.g., classification type) for the one digital asset, wherein the analysis may include classification of the one digital asset into the type. In accordance with an embodiment, the analysis uses data associated with the one digital asset, including associated metadata, associated semantic data and 3D model data (e.g., including textures, materials, meshes, rigging, polygon data, and more) received with the one digital asset. In accordance with an embodiment, the classification may be performed with any classification method or algorithm (e.g., machine learning classifiers, Bayesian classifiers, etc.).

In accordance with an embodiment, in operation 206 of the method 200, the intelligent digital asset modification module 124 may query a database for additional data associated with the determined classification type. The additional data including semantic data associated with the determined classification type. For example, based on the one digital asset being classified as a 'bar stool' type, the additional data may include semantic data regarding bar stools, such that they are a form of chair (e.g., and may inherit all properties associated with a chair) which is itself a form of furniture, typically are backless (e.g., may be presented as a percentage), they are higher off the ground than typical chairs, are often positioned near a bar or counter, often have a cylindrical sitting area, have legs, etc. The additional data provides semantic information about the determined classification type. In accordance with an embodiment, the database may include ontological data, wherein the ontological data may include relations, attributes, rules and more between concepts associated with the classification type, including but not limited to taxonomy (e.g., including classification, hypernyms, hyponyms, meronyms), components (e.g., parts of a classification type such as parts of a fridge), contents of a digital asset of a classification type (e.g., contents of a fridge), material components of a digital asset of a classification type (e.g., what material a digital asset of a classification type is made from), abilities of a digital asset of a classification type (e.g., purpose a fridge is used for).

In accordance with an embodiment, as part of operation 206, the intelligent digital asset modification module 124 compares the received additional data to the data associated with the one digital asset. In accordance with an embodiment, the comparison including determining missing data and conflicting data, wherein the missing data includes data from the additional data which is absent from the data associated with the digital asset, and wherein the conflicting data includes data from the additional data which is different from the data associated with the digital asset. In accordance with an embodiment, the determining of missing and conflicting data may include an analysis of the one digital asset with respect to the received target environment to determine any relationship between the two in order to select relevant data from the missing or conflicting data based on a similarity or contextual relationship. For example, the comparison may determine that semantic data included in the additional data and related to the classification type is absent from the data associated with the digital asset. In accordance with an embodiment, the determined missing and conflicting data may be flagged so that it may be displayed to a user via a display device.

In accordance with an embodiment, the comparison including determining missing data and conflicting data within operation 206 may be performed by a trained artificial intelligence agent (AI agent), wherein the trained AI agent has been previously trained on data (e.g., data within the database) to optimally determine missing data and conflicting data for specific digital assets (e.g., including types of digital assets) when compared to the additional data. In accordance with an embodiment, the trained AI agent may additionally be trained using data describing an environment (e.g., the target environment) in order to optimally recognize and determine missing data and conflicting data for digital assets (e.g., and types of digital assets including the determined classification type) in a context associated with the environment. The trained AI may be trained to determine that missing data and conflicting data for a digital asset may be dependent on an environment, wherein a same digital asset may require different missing data and conflicting data for different environments. For example, a trained AI agent may determine that a digital asset have a first set of missing data and conflicting data in a first environment and a second set of missing data and conflicting data in a second environment. In accordance with an embodiment, the trained AI agent may be implemented in the intelligent asset modification user device 104 or the knowledge server 140.

In accordance with an embodiment, at operation 208 of the method, the intelligent digital asset modification module 124 modifies the data associated with the one digital asset (e.g., including the metadata) by adding semantic data from the database based on the determined missing or conflicting data. For example, based on the database including semantic data for the determined classification type which is missing in the data associated with the one digital asset, the intelligent digital asset modification module 124 adds the missing semantic data to the data associated with the one digital asset. Accordingly, semantic data within the database and associated with the determined classification type may be transferred to (e.g., associated with) the one digital asset, wherein the transferring includes adding the semantic data to the data associated with the digital asset (e.g., including the metadata).

In accordance with an embodiment, at operation 210 of the method 200, the intelligent digital asset modification module 124 analyzes the data associated with the one digital asset to determine whether a size of the one digital asset matches an expected size within the additional data received from the database (e.g., based on sizes of other assets of the same type). In accordance with an embodiment, based on a determined difference in size, the size data associated with the one digital asset may be modified to conform to the expected size and/or may be flagged as being different. In accordance with an embodiment, the analysis in operation 210 may also include an analysis of the target environment data to determine a size scale of the target environment in order to equalize a scale of the one digital asset with a scale of the environment.

In accordance with an embodiment, the analysis of the data and the received additional data within operation 210 may be performed by a trained artificial intelligence agent (AI agent), wherein the trained AI agent has been previously trained on data (e.g., data within the database) to optimally recognize and determine size differences for specific digital assets (e.g., including types of digital assets). In accordance with an embodiment, the trained AI agent may additionally be trained using data describing an environment (e.g., the target environment) in order to optimally recognize size differences for digital assets and objects and types of digital assets and objects (e.g., including the determined classification type) in a context associated with the environment. The trained AI may be trained to determine that a size for a digital asset may be dependent on an environment, wherein a same digital asset may require different size for different environments. For example, a trained AI agent may determine that a digital asset have a first size in a first environment and a second size in a second environment. In accordance with an embodiment, the trained AI agent may be implemented in the intelligent asset modification user device 104 or the knowledge server 140.

Figure 3:
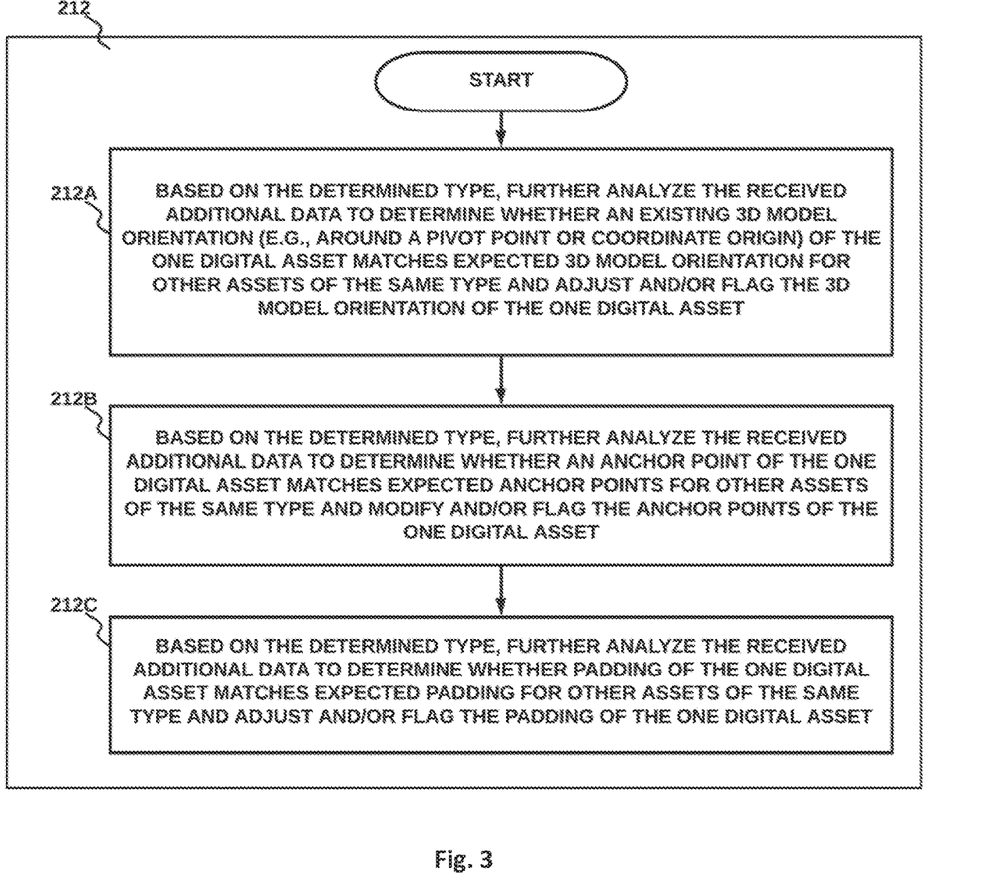
FIG. 3 is a flowchart illustrating a method for intelligent digital asset modification using an intelligent digital asset modification system, in accordance with one embodiment.

In accordance with an embodiment, at operation 212 of the method 200, the intelligent digital asset modification module 124 performs additional modifications of the data and metadata associated with the one digital asset with respect to padding, anchor points, and orientation as described in detail in FIG. 3.

In accordance with an embodiment, at operation 214 of the method 200, the one digital asset may be spawned in the target environment based on the modified data and metadata associated with the digital asset (e.g., including the addition of semantic data as described in operation 208, the resizing sizing as described in operation 210, the modification of orientation data as described in operation 212A, the addition of anchor one or more anchor points as described in operation 212B, and the addition of padding data as described in operation 212C). Once spawned, the digital asset becomes a digital object within the environment.

In accordance with an embodiment, and shown in FIG. 3, and as part of operation 212, in operation 212A, based on the determined classification type, the intelligent digital asset modification module 124 further analyzes the received additional data to determine a 3D model orientation (e.g., around a pivot point or coordinate origin) of the one digital asset and compares the determined orientation with expected 3D model orientation for other assets of the same type from within the additional data. In accordance with an embodiment, based on there being a difference between the determined orientation and the expected orientation, the intelligent digital asset modification module 124 may modify the data associated with the digital asset (e.g., including the metadata) to change the determined orientation to the expected 3D model orientation.

In accordance with an embodiment, digital assets are often created without proper orientation (e.g., created within 3D digital model content creation applications). In accordance with an embodiment, the orientation may include an offset position from a pivot point or coordinate origin. The improperly oriented digital assets then require manual labor to place within an environment. For example, a pivot point for a digital asset may typically be at the center of a 3D model and may have a predetermined forward direction (e.g., determined during creation of the digital asset in 3D creation software). However, some digital assets may have an asymmetry based on a type of object it represents wherein the center of the 3D model is not optimal as a pivot point. For example, a digital object representing a coffee mug may be modified (using operation 212A) to slide the spawning pivot point towards a center point of the mug cylinder (e.g., not a center point of the entire mug) to compensate for a handle and set the main cylinder as a center of rotation. The method within operation 212A can be used with the method 200 to implement an automated process of associating proper orientation to improperly oriented digital assets based on the further analysis of the received additional data from the database. In accordance with an embodiment, the further analysis of the received additional data within operation 212A may be performed by a trained artificial intelligence agent (AI agent), wherein the trained AI agent has been previously trained on data (e.g., data within the database) to optimally recognize and determine orientation for specific digital assets and objects and types of digital assets and objects. In accordance with an embodiment, the trained AI agent may additionally be trained using data describing an environment (e.g., environment data) in order to optimally recognize orientation for digital assets and objects and types of digital assets and objects (e.g., including the determined classification type) in a context associated with the environment. The trained AI may be trained to determine that orientation for a digital asset may be dependent on an environment, wherein a same digital asset may require different orientation for different environments. For example, a trained AI agent may determine that a digital asset have a first orientation in a first environment and a second orientation in a second environment. In accordance with an embodiment, the trained AI agent may be implemented in the intelligent asset modification user device 104 or the knowledge server 140.

In accordance with an embodiment, in part of operation 212B of operation 212, based on the determined classification type, the intelligent digital asset modification module 124 further analyzes the received additional data to determine whether an anchor point of the one digital asset matches expected anchor points for other assets of the same type, and based on the matching modifies and/or flags the anchor points of the one digital asset. In accordance with an embodiment, based on there being a difference between the determined anchor points and the expected anchor points, the intelligent digital asset modification module 124 may modify the data associated with the digital asset (e.g., including the metadata) to change the determined anchor points to the expected 3D model anchor points.

In accordance with an embodiment, an anchor point is a point or surface on a digital object (e.g., instantiated from a digital asset) which can be used as a connection point within an environment. The anchor point may be used when a digital asset is instantiated (e.g., spawned) in an environment in order to help guide a placement of the digital object whether the placement is automated or manual. Typical anchor points for a digital object represent points on the digital object that are in contact with the environment based on the type of object. Anchor points can also have a direction so that they contact points in the environment which satisfy the direction. For example, most objects would have an anchor point at the lowest point of the object and have a downward direction since most objects contact a floor or ground within an environment with a lowest part of the object. For example, a table might have one anchor at the bottom of each table leg (and which points downward to a floor) in order to contact a floor in an environment evenly. Similar anchor points could be used for other furniture, such as chairs, couches, and the like. Other types of objects might have anchor points on a back surface so that they contact the environment with the back surface (e.g., contacting a wall) such as mirrors, paintings, sconces, and the like. Still other types of objects might have anchor points along a top part of the digital object and have an upward direction so that they hang from a ceiling within an environment; for example chandeliers (and other light sources), swings, hanging plants, and the like.

As an example of anchors, based on the digital asset being a wardrobe, anchors may be associated to the bottom legs of the wardrobe and other anchors may be associated with a 'back' surface of the wardrobe so that the wardrobe would spawn in the environment on a floor and up against a wall.

In accordance with an embodiment, digital assets are often created without specific anchor points (e.g., created within 3D digital model content creation applications). The anchorless digital assets then require manual labor to place within an environment. The method within operation 212B can be used with the method 200 to implement an automated process of associating anchors with anchorless digital assets based on the further analysis of the received additional data from the database. In accordance with an embodiment, the further analysis of the received additional data within operation 212B may be performed by a trained artificial intelligence agent (AI agent), wherein the trained AI agent has been previously trained on data (e.g., data within the database) to optimally recognize and determine anchor points for specific digital assets and objects and types of digital assets and objects (e.g., including the determined classification type). In accordance with an embodiment, the trained AI agent may additionally be trained using data describing an environment (e.g., environment data) in order to optimally recognize and determine anchor points for digital assets and objects and types of digital assets and objects (e.g., including the determined classification type) in a context associated with the environment. The trained AI may be trained to determine that properties of anchor points (e.g., size, orientation, positioning on a digital asset) for a digital asset may be dependent on an environment, wherein a same digital asset may require different anchor points for different environments. For example, a trained AI agent may determine that a digital asset have a first set of anchor points in a first environment and a second set of anchor points in a second environment. In accordance with an embodiment, the trained AI agent may be implemented in the intelligent asset modification user device 104 or the knowledge server 140.

In accordance with an embodiment, in part of operation 212C of operation 212, based on the determined classification type, the intelligent digital asset modification module 124 further analyzes the received additional data to determine whether a padding of the one digital asset matches expected padding for other assets of the same type, and based on the matching modifies and/or flags the padding of the one digital asset. In accordance with an embodiment, the padding represents empty space around a digital asset when the asset is spawned in an environment which may help accuracy of a digital asset used in an environment. For example, padding added behind a refrigerator digital asset may correspond to a real-life gap between the refrigerator and a wall in the environment. As another example, a digital asset may require a minimal padding above another object (e.g., a digital object representing a painting may require a minimal height above a floor). In accordance with an embodiment, based on there being a difference between the determined padding and the expected padding, the intelligent digital asset modification module 124 may modify the data associated with the digital asset (e.g., including the metadata) to change the determined padding to the expected padding.

In accordance with an embodiment, digital assets are often created without padding (e.g., created within 3D digital model content creation applications). Manual labor is required to add padding to digital assets in order for them to blend into an environment more efficiently. The method within operation 212C can be used with the method 200 to implement an automated process of adding or modifying padding of a digital asset based on the further analysis of the received additional data from the database. In accordance with an embodiment, the further analysis of the received additional data within operation 212C may be performed by a trained artificial intelligence agent (AI agent), wherein the trained AI agent has been previously trained on data (e.g., data within the database) to optimally recognize and determine padding for digital assets and objects and types of digital assets and objects (e.g., including the determined classification type). In accordance with an embodiment, the trained AI agent may additionally be trained using data describing an environment (e.g., environment data) in order to optimally recognize and determine padding for digital assets and objects and types of digital assets and objects (e.g., including the determined classification type) in a context associated with the environment. The trained AI may be trained to determine that properties of padding (e.g., 3D shape of the padding) for a digital asset may be dependent on an environment, wherein a same digital asset may require different padding for different environments. For example, a trained AI agent may determine that a digital asset have a first padding in a first environment and a second padding in a second environment. In accordance with an embodiment, the trained AI agent may be implemented in the intelligent asset modification user device 104 or the knowledge server 140.

In accordance with an embodiment, at operation 212 of the method 200, UI tools are provided within the cube to add padding around the displayed digital asset. The padding represents space around the displayed digital asset when the asset is spawned in the environment (e.g., adding space behind a refrigerator digital asset so that a spawned refrigerator digital object in the environment has space behind it from the back of the refrigerator to a wall in the environment). In accordance with an embodiment, the UI tool is used to add padding by receiving instructions from an observer (e.g., a user 102 or AI agent). In accordance with an embodiment, the padding will help spawning of digital objects in the environment by the intelligent digital asset modification system 100 to be more efficient (e.g., reducing manual corrections after spawning) and accurate (e.g., realistic placement with respect to real life environments) when spawning objects within the environment. For example, in a situation where a refrigerator is moved within an environment, the added padding will help to keep a space between the back of the fridge and a kitchen wall, or similarly between a stove and the side of the fridge. The UI Tools within the cube can add padding to any side of the displayed digital asset. For example, a displayed digital asset may require a minimal height above another object (e.g., a digital object representing a painting may require a minimal height above a floor). In accordance with an embodiment, data describing the padding determined during operation 212 is added to the spawning data for the digital asset.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
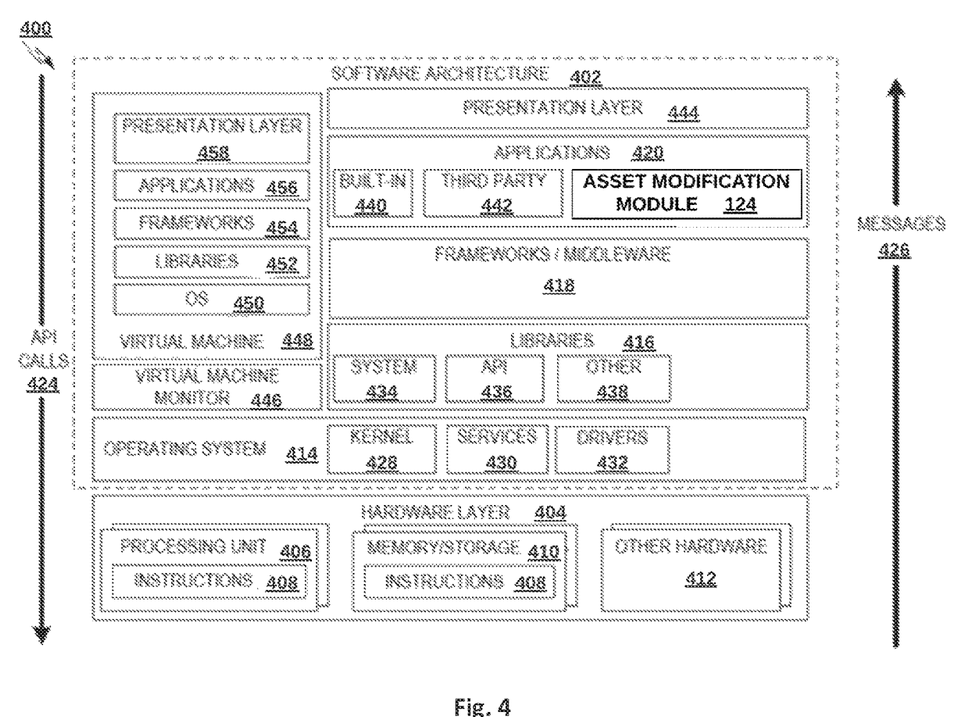
FIG. 4 is a block diagram illustrating an example software architecture, which may be used in conjunction with various hardware architectures described herein.

FIG. 4 is a block diagram 400 illustrating an example software architecture 402, which may be used in conjunction with various hardware architectures herein described to provide a gaming engine 401 and/or components of the intelligent digital asset modification system 100. FIG. 4 is a non-limiting example of a software architecture and it will be appreciated that many other architectures may be implemented to facilitate the functionality described herein. The software architecture 402 may execute on hardware such as a machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 having associated executable instructions 408. The executable instructions 408 represent the executable instructions of the software architecture 402, including implementation of the methods, modules and so forth described herein. The hardware layer 404 also includes memory/storage 410, which also includes the executable instructions 408. The hardware layer 404 may also comprise other hardware 412.

In the example architecture of FIG. 4, the software architecture 402 may be conceptualized as a stack of layers where each layer provides particular functionality. For example, the software architecture 402 may include layers such as an operating system 414, libraries 416, frameworks or middleware 418, applications 420 and a presentation layer 444. Operationally, the applications 420 and/or other components within the layers may invoke application programming interface (API) calls 424 through the software stack and receive a response as messages 426. The layers illustrated are representative in nature and not all software architectures have all layers. For example, some mobile or special purpose operating systems may not provide the frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be used by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 516 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) provide a higher-level common infrastructure that may be used by the applications 420 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be utilized by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. Third-party applications 442 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 442 may invoke the API calls 424 provided by the mobile operating system such as operating system 414 to facilitate functionality described herein.

The applications 440 may use built-in operating system functions (e.g., kernel 428, services 430 and/or drivers 432), libraries 416, or frameworks/middleware 418 to create user interfaces to interact with users of the system. Alternatively, or additionally, in some systems, interactions with a user may occur through a presentation layer, such as the presentation layer 444. In these systems, the application/module "logic" can be separated from the aspects of the application/module that interact with a user.

Some software architectures use virtual machines. In the example of FIG. 4, this is illustrated by a virtual machine 448. The virtual machine 448 creates a software environment where applications/modules can execute as if they were executing on a hardware machine (such as the machine 500 of FIG. 5, for example). The virtual machine 448 is hosted by a host operating system (e.g., operating system 414) and typically, although not always, has a virtual machine monitor 446, which manages the operation of the virtual machine 448 as well as the interface with the host operating system (i.e., operating system 414). A software architecture executes within the virtual machine 448 such as an operating system (OS) 450, libraries 452, frameworks 454, applications 456, and/or a presentation layer 458. These layers of software architecture executing within the virtual machine 448 can be the same as corresponding layers previously described or may be different.

Figure 5:
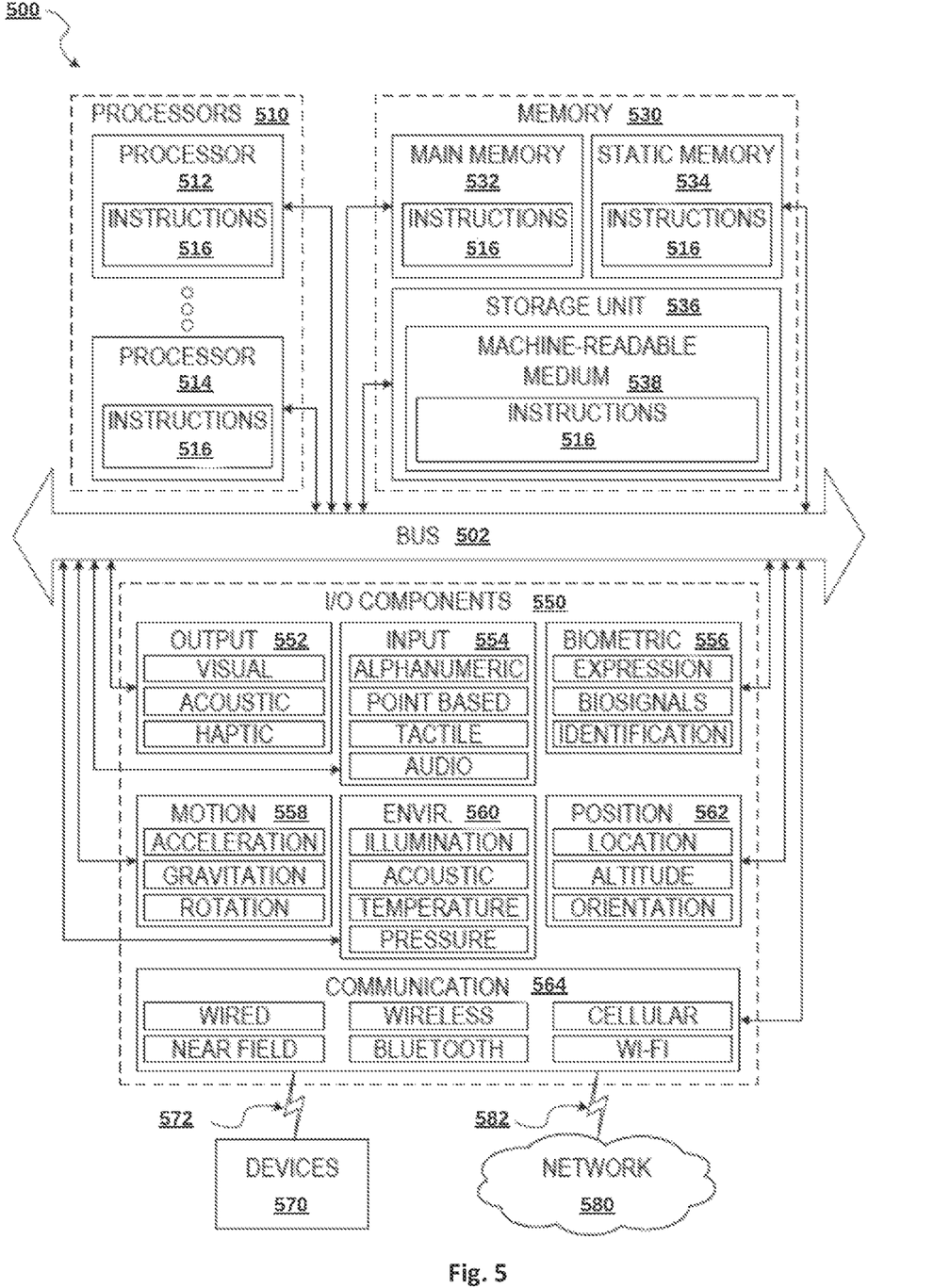
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 500, according to some example embodiments, configured to read instructions from a machine-readable medium (e.g., a machine-readable storage medium) and perform any one or more of the methodologies discussed herein. In some embodiments, the machine 110 is similar to the user device 104. Specifically, FIG. 5 shows a diagrammatic representation of the machine 500 in the example form of a computer system, within which instructions 816 (e.g., software, a program, an application, an applet, an app, or other executable code) for causing the machine 500 to perform any one or more of the methodologies discussed herein may be executed. As such, the instructions 516 may be used to implement modules or components described herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that may execute the instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiples cores, or any combination thereof.

The memory/storage 530 may include a memory, such as a main memory 532, a static memory 534, or other memory, and a storage unit 536, both accessible to the processors 510 such as via the bus 502. The storage unit 536 and memory 532, 534 store the instructions 516 embodying any one or more of the methodologies or functions described herein. The instructions 516 may also reside, completely or partially, within the memory 532, 534, within the storage unit 536, within at least one of the processors 510 (e.g., within the processor's cache memory), or any suitable combination thereof, during execution thereof by the machine 500. Accordingly, the memory 532, 534, the storage unit 536, and the memory of processors 510 are examples of machine-readable media 538.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 550 may include many other components that are not shown in FIG. 5. The input/output (I/O) components 550 are grouped according to functionality merely for simplifying the following discussion and the grouping is in no way limiting. In various example embodiments, the input/output (I/O) components 550 may include output components 852 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 550 may include biometric components 556, motion components 558, environmental components 560, or position components 862, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 550 may include communication components 564 operable to couple the machine 500 to a network 880 or devices 870 via a coupling 882 and a coupling 872 respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 562, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
one or more computer processors;
one or more computer memories;
one or more modules incorporated into the one or more computer memories, the one or more modules configuring the one or more computer processors to perform operations, the operations comprising:
receiving asset data describing the digital asset;
analyzing the received asset data to determine a classification type for the digital asset;
requesting additional data associated with the determined classification type, the additional data based on an analysis of the digital asset with respect to a target environment and the additional data including semantic data associated with the classification type;
comparing the additional data to the received asset data, wherein the comparing includes determining missing data and conflicting data, the missing data including data from the additional data which is absent from the asset data;
modifying the asset data by adjusting the conflicting data and adding the missing data to the asset data to conform the asset data to the classification type for the target environment;
further analyzing the asset data to determine a size and scale of the digital asset;
comparing the determined size and scale with a potential size and scale for the classification type as described within the additional data, wherein the potential size and scale are be associated with the target environment; and performing one or more of the following:

modifying the determined size and scale to match the potential size and scale; and flagging data in the asset data which is associated with the determined size and scale based on a determined difference between the determined size and scale and the potential size and scale.

2. The system of claim 1, wherein the comparing includes using a trained artificial intelligence agent to determine the missing and conflicting data, wherein the artificial intelligence agent is trained on data in a database to determine missing and conflicting data related to a classification type.

3. The system of claim 1, the operations further including receiving environment data describing the target environment, and wherein the requesting additional data includes requesting data associated with the determined classification type and associated with the environment data.

4. The system of claim 1, wherein the comparing includes determining a difference between the asset data and the additional data, and performing at least one of the following:

modifying data in the asset data to eliminate the determined difference; and flagging data corresponding to the difference within the asset data.

5. The system of claim 1, wherein the operations include replacing the conflicting data in the asset data with the associated conflicting data in the additional data.

6. The system of claim 1, wherein a database includes ontological data associated with classification types.

7. The system of claim 1, wherein the operations include:

further analyzing the asset data to determine an orientation of the digital asset;

comparing the determined orientation with a potential orientation for the classification type as described within the additional data, wherein the potential orientation is associated with the target environment; and performing one or more of the following:

modifying the determined orientation to match the potential orientation; and flagging the determined orientation data based on a difference with the potential orientation.

8. The system of claim 1, wherein the operations include:

further analyzing the asset data to determine one or more anchors within the digital asset;

comparing the determined one or more anchors to a potential one or more anchors for the classification type as described within the additional data, wherein the potential one or more anchors are associated with the target environment; and performing one or more of the following:

modifying the determined one or more anchors to match the potential one or more anchors; and flagging the determined one or more anchors based on a difference with the potential one or more anchors.

9. The system of claim 1, wherein the operations include:

further analyzing the asset data to determine a padding within the digital asset;

comparing the determined padding to a potential padding as described within the additional data, wherein the potential padding is associated with the target environment; and performing one or more of the following:

modifying the determined padding to match the potential padding; and flagging the determined padding based on a difference with the potential padding.

10. A non-transitory computer-readable storage medium storing a set of instructions that, when executed by one or more computer processors, perform operations, the operations comprising:

receiving asset data describing the digital asset;

analyzing the received asset data to determine a classification type for the digital asset;

requesting additional data associated with the determined classification type, the additional data based on an analysis of the digital asset with respect to a target environment and the additional data including semantic data associated with the classification type;

comparing the additional data to the received asset data, wherein the comparing includes determining missing data and conflicting data, the missing data including data from the additional data which is absent from the asset data;

modifying the asset data by adjusting the conflicting data and adding the missing data to the asset data to conform the asset data to the classification type for the target environment; further analyzing the asset data to determine a size and scale of the digital asset;

comparing the determined size and scale with a potential size and scale for the classification type as described within the additional data, wherein the potential size and scale are associated with the target environment; and performing one or more of the following:

modifying the determined size and scale to match the potential size and scale; and flagging data in the asset data which is associated with the determined size and scale based on a determined difference between the determined size and scale and the potential size and scale.

11. The non-transitory computer-readable storage medium of claim 10, wherein the comparing includes using a trained artificial intelligence agent to determine the missing and conflicting data, wherein the artificial intelligence agent is trained on data in a database to determine missing and conflicting data related to a classification type.

12. The non-transitory computer-readable storage medium of claim 10, the operations further including receiving environment data describing the target environment, and wherein the requesting additional data includes requesting data associated with the determined classification type and associated with the environment data.

13. The non-transitory computer-readable storage medium of claim 10, wherein the comparing includes determining a difference between the asset data and the additional data, and performing at least one of the following:

modifying data in the asset data to eliminate the determined difference; and flagging data corresponding to the difference within the asset data.

14. The non-transitory computer-readable storage medium of claim 10, wherein the operations include replacing the conflicting data in the asset data with the associated conflicting data in the additional data.

15. The non-transitory computer-readable storage medium of claim wherein a database includes ontological data associated with classification types.

16. The non-transitory computer-readable storage medium of claim 10, wherein the operations include:

further analyzing the asset data to determine an orientation of the digital asset;

comparing the determined orientation with a potential orientation for the classification type as described within the additional data, wherein the potential orientation is associated with the target environment; and performing one or more of the following:
   modifying the determined orientation to match the potential orientation; and
   flagging the determined orientation data based on a difference with the potential orientation.

17. The non-transitory computer-readable storage medium of claim 10, wherein the operations include:
   further analyzing the asset data to determine one or more anchors within the digital asset;
   comparing the determined one or more anchors to a potential one or more anchors for the classification type as described within the additional data, wherein the potential one or more anchors are associated with the target environment; and
   performing one or more of the following:
   modifying the determined one or more anchors to match the potential one or more anchors; and
   flagging the determined one or more anchors based on a difference with the potential one or more anchors.

18. A method comprising:
   receiving asset data describing the digital asset;
   analyzing the received asset data to determine a classification type for the digital asset;
   requesting additional data associated with the determined classification type, the additional data based on an analysis of the digital asset with respect to a target environment and the additional data including semantic data associated with the classification type;
   comparing the additional data to the received asset data, wherein the comparing includes determining missing data and conflicting data, the missing data including data from the additional data which is absent from the asset data;
   modifying the asset data by adjusting the conflicting data and adding the missing data to the asset data to conform the asset data to the classification type for the target environment; further analyzing the asset data to determine a size and scale of the digital asset;
   comparing the determined size and scale with a potential size and scale for the classification type as described within the additional data, wherein the potential size and scale are associated with the target environment; and
   performing one or more of the following:
   modifying the determined size and scale to match the potential size and scale; and
   flagging data in the asset data which is associated with the determined size and scale based on a determined difference between the determined size and scale and the potential size and scale.

* * * * *